(12) United States Patent
Dhokia et al.

(10) Patent No.: US 11,659,009 B2
(45) Date of Patent: May 23, 2023

(54) METHOD AND SYSTEMS FOR ANALYZING SECURITY COVERAGE OF A SET OF ENTERPRISE ACCESS MANAGEMENT POLICIES

(71) Applicant: Microsoft Technology Licensing, LLC, Redmond, WA (US)

(72) Inventors: Dilesh Dhokia, Kirkland, WA (US); Caleb Geffrey Baker, Seattle, WA (US); Daniel Edward Lee Wood, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 17/164,041

(22) Filed: Feb. 1, 2021

(65) Prior Publication Data
US 2022/0247790 A1 Aug. 4, 2022

(51) Int. Cl.
*H04L 29/00* (2006.01)
*H04L 9/40* (2022.01)

(52) U.S. Cl.
CPC ............ *H04L 63/205* (2013.01); *H04L 63/08* (2013.01); *H04L 63/102* (2013.01); *H04L 63/107* (2013.01); *H04L 63/1433* (2013.01)

(58) Field of Classification Search
CPC ..... H04L 63/205; H04L 63/08; H04L 63/102; H04L 63/107; H04L 63/1433; H04L 63/10
See application file for complete search history.

(56) References Cited

U.S. PATENT DOCUMENTS

| | | | |
|---|---|---|---|
| 9,529,993 B2* | 12/2016 | Kapadia | G06F 21/40 |
| 10,091,231 B1* | 10/2018 | Gates | H04L 63/1425 |
| 10,122,757 B1 | 11/2018 | Kruse et al. | |
| 10,511,632 B2* | 12/2019 | Ward | H04L 63/20 |
| 11,100,232 B1* | 8/2021 | Juncker | H04L 63/102 |
| 2009/0271863 A1 | 10/2009 | Govindavajhala et al. | |
| 2012/0221486 A1* | 8/2012 | Leidner | G06Q 40/08 |
| | | | 705/36 R |
| 2014/0143879 A1* | 5/2014 | Milman | G06F 21/577 |
| | | | 726/25 |
| 2018/0107820 A1* | 4/2018 | Simakov | G06F 21/316 |
| 2019/0095230 A1* | 3/2019 | Glessner | G06F 21/51 |

(Continued)

OTHER PUBLICATIONS

"International Search Report and Written Opinion Issued in PCT Application No. PCT/US22/012396", dated Apr. 4, 2022, 13 Pages.

*Primary Examiner* — Don G Zhao
(74) *Attorney, Agent, or Firm* — Schwegman Lundberg & Woessner, P.A.

(57) ABSTRACT

Disclosed in some examples, are methods, systems, and machine-readable mediums for identifying security vulnerabilities across a plurality of access control policies. An administrator of the computing resource may be alerted to these vulnerabilities to allow the administrator to craft a policy, or modify an existing policy, to close these security gaps. In other examples, the system may automatically suggest and/or apply a modification to an existing policy or a new access control policy that closes the security gaps. The vulnerabilities may be determined based upon a comparison of the access control policy criteria in the previously set access control policies and a set of possible values of access control signals to determine access scenarios that are not covered by the access control policies.

20 Claims, 9 Drawing Sheets

(56) References Cited

U.S. PATENT DOCUMENTS

| | | | |
|---|---|---|---|
| 2019/0327271 A1 | 10/2019 | Saxena et al. | |
| 2020/0177444 A1* | 6/2020 | Nelson-Gal | H04L 67/56 |
| 2020/0242251 A1* | 7/2020 | Wisgo | G06F 21/564 |
| 2020/0382543 A1* | 12/2020 | Hoopes | H04L 63/168 |
| 2021/0044579 A1* | 2/2021 | Nelson-Gal | H04L 41/0859 |
| 2022/0086193 A1* | 3/2022 | Nguyen | H04L 63/205 |
| 2022/0141187 A1* | 5/2022 | Biradar | H04L 67/56 726/11 |
| 2022/0247790 A1* | 8/2022 | Dhokia | H04L 63/08 |

* cited by examiner

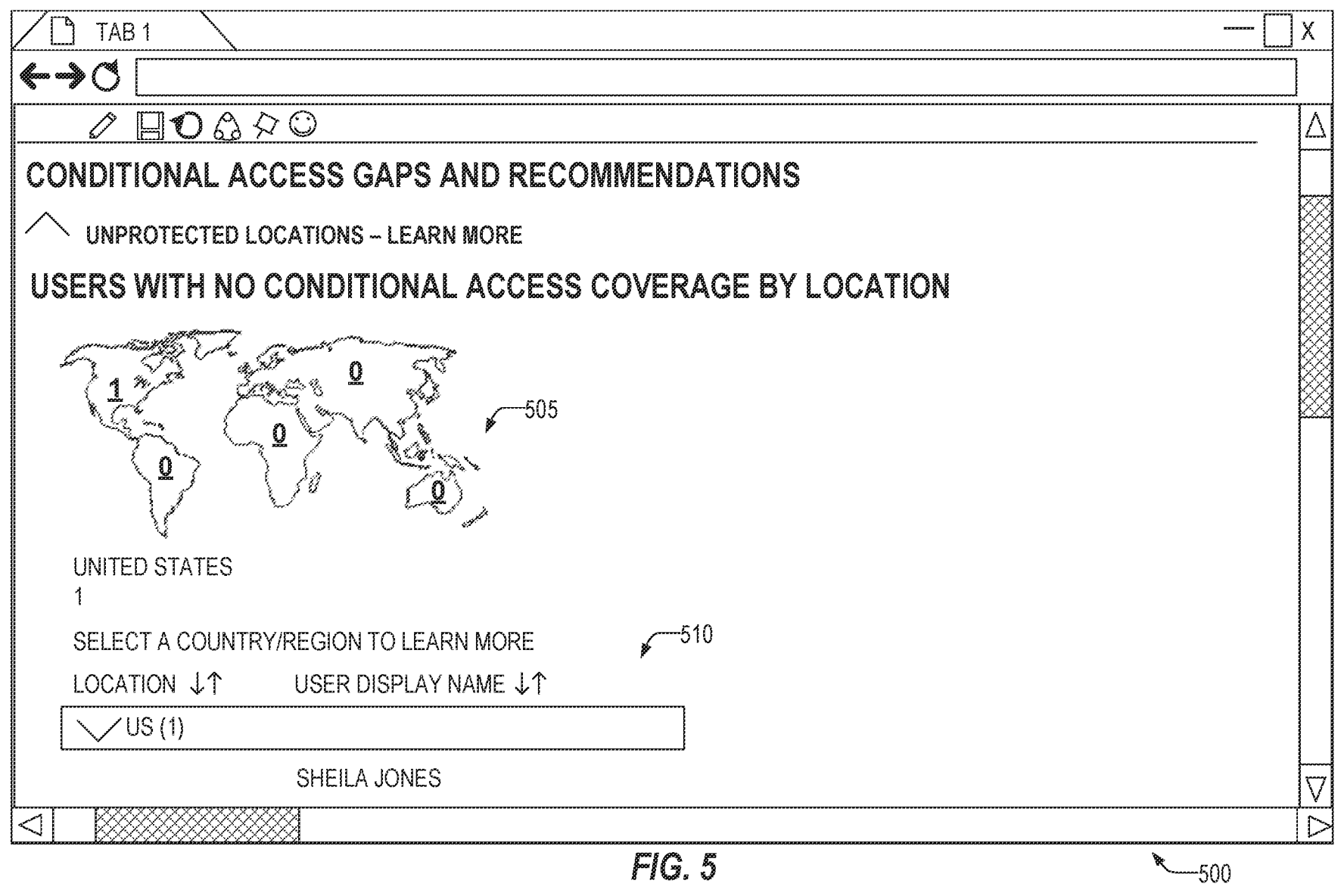

CONDITIONAL ACCESS GAPS AND RECOMMENDATIONS

< UNPROTECTED LOCATIONS – LEARN MORE

USERS WITH NO CONDITIONAL ACCESS COVERAGE BY LOCATION

UNITED STATES
1

SELECT A COUNTRY/REGION TO LEARN MORE

LOCATION ↓↑    USER DISPLAY NAME ↓↑

∨ US (1)

SHEILA JONES

FIG. 5

METHOD AND SYSTEMS FOR ANALYZING SECURITY COVERAGE OF A SET OF ENTERPRISE ACCESS MANAGEMENT POLICIES

TECHNICAL FIELD

Embodiments pertain to access control for computer resources. Some embodiments relate to detecting and preventing potential access control gaps.

BACKGROUND

Computing resources such as email hosting services, communication services, file sharing services, storage services, and other such services must be protected from unauthorized access. Typically, these computing resources have access control procedures that include at least two conceptual steps. The first step is authentication, in which the system verifies the identity of a user. This may include verifying a username and a password of the user. The second step is access control in which the system determines whether the identified user is entitled to access the computing resource. For example, the identified user may have a user account but may not be entitled to access a certain computing resource.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates an unprotected locations screen according to some examples of the present disclosure.

DETAILED DESCRIPTION

Figure 1:
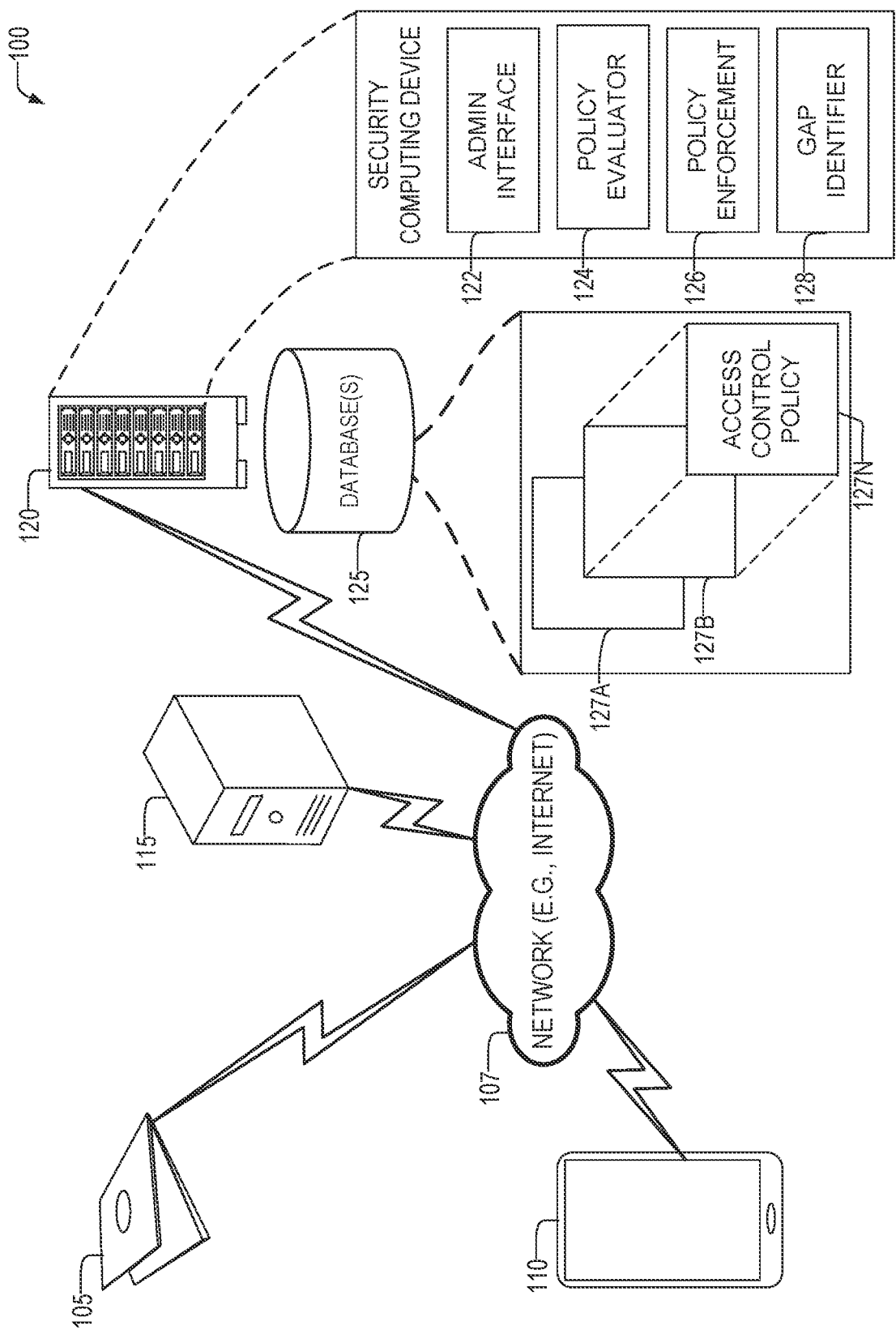
FIG. 1 illustrates an example access environment according to some examples of the present disclosure.

Computerized resources typically have sets of access control policies that specify access controls that apply to various access scenarios. The access control policies specify the access scenarios for which the policy applies by specifying access control policy criteria. The access control policy criteria identify the particular access scenario for which the access control policy applies by specifying values or ranges of one or more access control signals. Access control signals may be attributes of a user, a device used by the user in the access attempt, an environment of the user at the time of the access attempt, an environment of the computer resource at the time of the event, or other context information corresponding to the access attempt.

Upon receiving a request for access to a computer resource, a computing device controlling the access (hereinafter an access control computing device) determines whether one or more access control policies apply to the access attempt. The access control computing device evaluates, for each particular access control policy, values of access control signals of an access attempt against the set of access control policy criteria in the particular access control policy to determine if the particular access control policy applies to the particular access attempt. Upon finding one or more policies that apply, the policies indicate access controls that control whether to grant access, and any conditions to apply to the access.

These access control policies give very granular control to administrators to determine how a computerized resource is accessed. Organizations spend significant time, effort, and resources creating and customizing access control policies for their computing resources. The time and effort spent crafting these policies is done to ensure that appropriate access controls are in place so that these resources are properly protected. As access control policies have become more complicated and more numerous, the chances that an administrator forgets to properly set a policy to cover certain access scenarios increases. This creates the opportunity for security vulnerabilities where access control policies are either non-existent or are too lenient for a given scenario.

Disclosed in some examples, are methods, systems, and machine-readable mediums for identifying security vulnerabilities across a plurality of access control policies. An administrator of the computing resource may be alerted to these vulnerabilities to allow the administrator to craft a policy, or modify an existing policy, to close these security gaps. In other examples, the system may automatically suggest and/or apply a modification to an existing policy or a new access control policy that closes the security gaps. The vulnerabilities may be determined based upon a comparison of the access control policy criteria in the previously set access control policies and a set of possible values of access control signals to determine access scenarios that are not covered by the access control policies.

In some examples, the set of possible values of access control signals may be a set of all legal values of the access control signals. In other examples, the set of all possible values of access control signals may be a subset of all the legal values of the access control signals. The subset may be produced by filtering out values of access control signals that characterize less important access scenarios. This filtering may be done by a knowledgeable security expert that may identify important access scenarios and the access control signals that characterize those scenarios. For example, an access control policy covering access scenarios involving various versions of mobile device operating systems may not be very important for a computerized resource that does not allow access from mobile devices. In this example, values of the access control signals covering mobile access scenarios may be excluded (except perhaps to deny all access).

In other examples, the filtering may be done based upon automatic analysis using various data. For example, an automatic analysis of past access patterns of the specific computer resource or of other similar computing resources. For example, the system may automatically determine that most accesses occur within a particular geographic area, and, as a result, security gaps for access attempts within this area may be very important. Security gaps in other areas may be ignored, aggregated (as described below), or shown with less importance.

In still other examples, rather than filtering the set of possible values of access control signals, the identified security gaps may be automatically aggregated across common gaps found within multiple identified security gaps. For example, the currently set access control policies may block access for users running Android versions 4.4 and below, but not have any restrictions or policies on iOS devices. The system may identify that no policies exist for Android versions 5.0, 6.0, 7.0, 8.0, 9, 10, or 11; and also that no policies exist for iOS versions 1, 2, 3, 4, 5, 6, 7, 8, 9, 10, 11, 12, 13, and 14. Rather than presenting 22 different scenarios, the system may aggregate the results to present two recommendations—one to set a policy for Android versions 5-11 and a second one for iOS (all versions). In other examples, a single recommendation may be made to set a policy for Android versions 5-11 and iOS (all versions).

In some examples, the system may both filter results and aggregate multiple scenarios that were not filtered. For example, as in the previous example, the system may have a set of filtering rules that indicates that iOS versions 6-12 are very secure and thus, the recommendation would only be to set a policy for versions 1, 2, 3, and 4. However, the recommendation would aggregate the results to present a single uncovered scenario for all of versions 1-4.

As previously noted, the system may also automatically suggest and/or implement one or more policies to address these security issues. This may be based upon a set of optimum access control policies developed by a security expert (such as a system designer). An access control policy that covers a scenario that would close the security gap may be automatically selected and may be shown to an administrator for approval (with or without customization) or automatically implemented. For example, the access control policy criteria of each of the optimum access control policies may be evaluated with one or more values of one or more access control signals corresponding to the gap to determine if one or more of the optimum access control policies would apply to the access scenario that is not covered by the current policies.

Upon finding one of these optimum access control policies, one or more of them may be applied. In some examples, configuration settings set by an administrator may determine which optimum access control policy to apply if more than one applies. For example, the optimum access control policy with the least restrictive access controls or in the alternative, the optimum access control policy with the most restrictive access controls.

The present disclosure thus solves the technical problem of security gaps in access control policies that may allow attackers access to computerized resources through the technical solution of performing an automated analysis of access control policies. In some examples, the technical solution also includes automatically suggesting and/or implementing these policies. In some examples, the automated analysis is performed on request from an administrator or other user through a GUI or an Application Programming Interface (API). In other examples, the automated analysis may be done periodically, after occurrence of an event (e.g., a modification, addition, deletion, or other operation performed on one of the access control policies), or the like.

FIG. 1 illustrates an example access environment 100 according to some examples of the present disclosure. User computing devices 105 and 110 access a computer resource provided by computing device 115 through a computer network 107. Computer resource may be any data, service, or resource and may include file storage, file sharing, email, communications, Voice over Internet Protocol (VoIP) service, chat service, processing services (e.g., the computing device 115 processes calculations or runs programs), or the like. In some examples, the computer resources may be resources on user computing devices 105 and 110. For example, the computing devices may require access control prior to their usage. Computer network 107 may include wired network, wireless network, packet-based network, circuit-based network, or any combination thereof.

In order to access the computerized resource user computing devices 105 and 110 must first be approved by access control computing device 120. Access control computing device 120 may be integrated with computing devices 115, 105, 110, or may be a separate computing device (as shown in FIG. 1).

Access control computing device 120 may have a database 125 with one or more access control policies 127A-127N. When a computing device, such as one of the user computing devices 105 and 110, tries to access a computerized resource, the policy evaluator component 124 of the access control computing device 120 may determine one or more access control signals applicable to the computing device that is attempting to access the computerized resource. For example, the signals may be indicated within an access request message sent by the computing device that is attempting to access the computerized resource.

The policy evaluator component 124 then determines whether one or more access control policies 127A-127N are applicable based upon evaluating the access control signals of the access attempt against the access control policy criteria of the access control policies 127A-127N. As previously explained, each access control policy may specify access control policy criteria that defines values for access control signals that define access scenarios that are subject to the access controls of the policy. In one example, the access control policy criteria may be that a location of the user is not in a home location of the computer resource. The access control signal of the accessing device's location is evaluated to determine whether the location is in the home location of the computer resource. If it is in the home location, then the policy does not apply. If it is not in the home location, then the policy does apply, and the access controls are enforced against the access attempt. Multiple applicable access control policies may apply to a particular access attempt. In some examples, multiple applicable access control policies may have conflicting access controls. In these examples, various conflict resolution rules may be applied. For example, a most restrictive policy may be the access control policy to apply.

The access controls specified by the applicable access control policies selected by the policy evaluator component 124 may then be applied by the policy enforcement component 126. Example access controls may include requiring additional authentication procedures (e.g., requiring two factor authentication), enforcing access restrictions (such as allowing access for certain functionality of the computing resource, but denying access for other functionality), and the like.

As previously noted, the access control computing device 120 may include an interface for setting and changing access control policies. This interface may be provided by the admin interface component 122. The admin interface component 122 may provide data for creation of one or more Graphical User Interfaces (GUIs) that allow for creating, viewing, changing, deleting, and otherwise managing one or more access control policies. The GUIs may be created by the admin interface component 122 and sent as one or more GUI descriptors to an administrator's computing device (not shown in FIG. 1) where it is rendered, such as with an Internet Browser. In these examples GUI descriptors may be one or more or a combination of Hypertext Markup Language (HTML) files, scripting files (such as JavaScript), Java modules, Cascading Style Sheets (CSS), or the like. In other examples, the admin interface component 122 may provide a GUI by sending data or information that is used by a dedicated application executing on the administrator's computing device to render a GUI. In still other examples the admin interface component 122 may provide one or more APIs that may be called from other applications and processes to set, change, delete, or modify one or more access control policies.

Gap identifier 128 may analyze the access control policies 127A-127N to determine one or more security vulnerabilities. As noted, gap identifier 128 may use a set of possible values of access control signals to identify these gaps. These possible values of access control signals may be filtered prior to gap identification. In some examples, instead of, or in addition to filtering the possible values of access control signals prior to identification of gaps, the identified gaps may be filtered and/or abstracted by the gap identifier 128 after identification of one or more gaps. Admin interface component 122 may present any gaps identified by the gap identifier 128 for presenting to an administrator through a GUI or programmatically through an API.

As noted, the gap identifier 128 may identify gaps responsive to a request by a user. In other examples, the gap identifier 128 may identify these gaps periodically or in response to various events. In examples in which the gaps are identified periodically or in response to various events, administrators of the system may be informed of gaps that are found by push or pull notifications delivered through a GUI interface or through the API interface (e.g., to one or more other applications, to a mobile device of a user, or the like).

Figure 2:
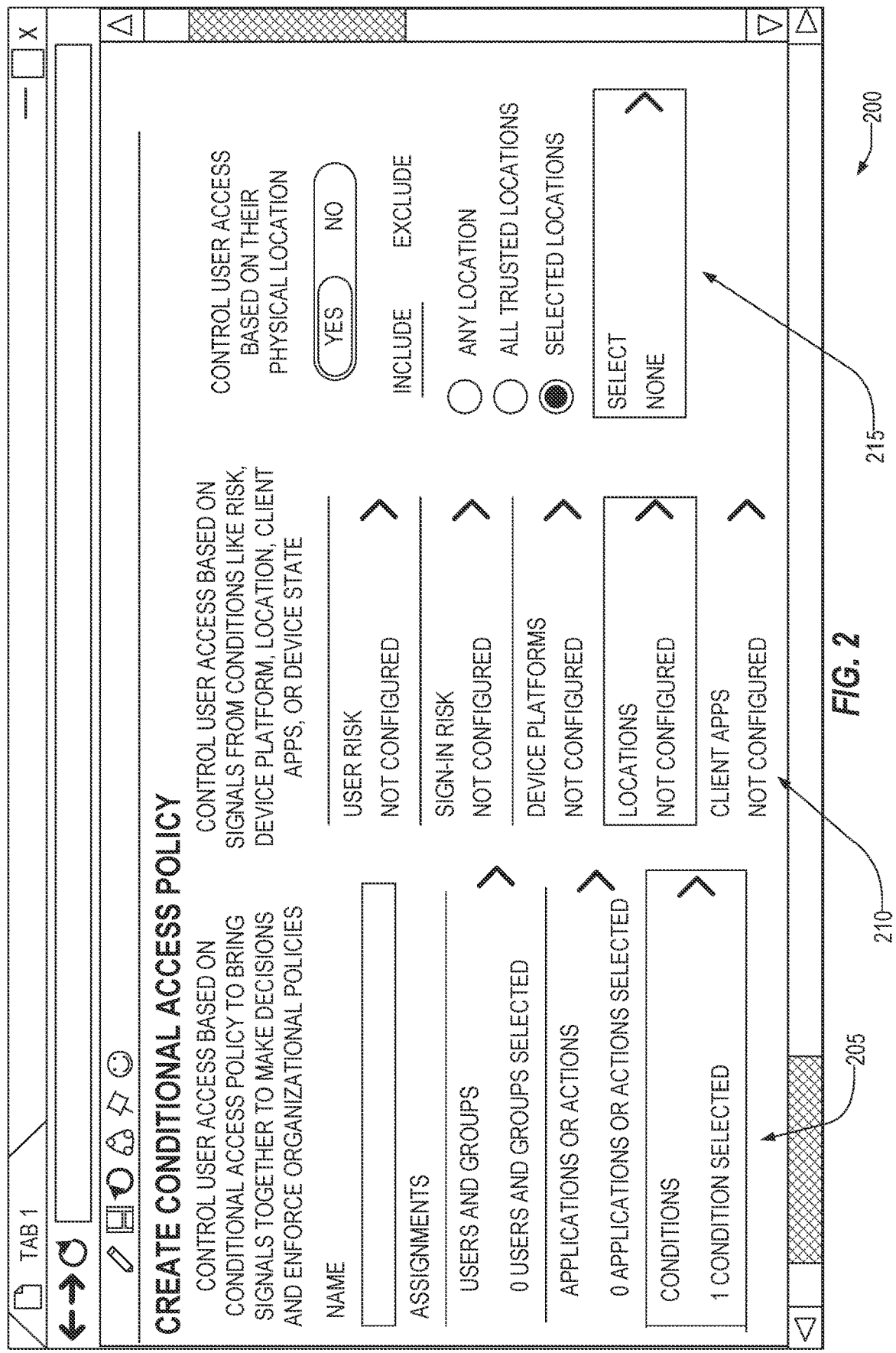
FIG. 2 illustrates a GUI for creating an access control policy according to some examples of the present disclosure.

FIG. 2 illustrates a GUI 200 for creating an access control policy according to some examples of the present disclosure. Pane 205 allows administrators to specify a name of the policy, and to open panels that allow administrators to set the access control policy criteria by specifying access control signal values that define an access scenario for which the access control policy applies. Example criteria include specifying particular users or groups; the applications or actions that the policy applies to; and conditions for the policy. In the example of FIG. 2, the conditions option is selected and a condition pane 210 is shown.

In the example of FIG. 2, in addition to other options, the policy may have access policy criteria related to user risk signals (e.g., if a risk score of a user is above a threshold score). The policy may have conditions related to sign-in risk such as if a sign-in risk (that scores a risk of a particular sign in attempt) is above a threshold score. The policy may also have criteria related to device type and software access signals such as what device platform is attempting to access the computerized resource (e.g., what operating system, what device type, and the like); what locations the user is attempting to access the computerized resource from; and what applications the client is using to access the computerized resource. In the example of FIG. 2, the user has selected the locations parameter and a locations panel 215 is displayed. Here the user can set location criteria of the policy such as which login locations are covered by the policy and locations that are not covered by the policy. The locations can be any location, all trusted locations (which are setup in a different location), or selected locations (which may be setup in the box below the radio button in FIG. 2).

Figure 3:
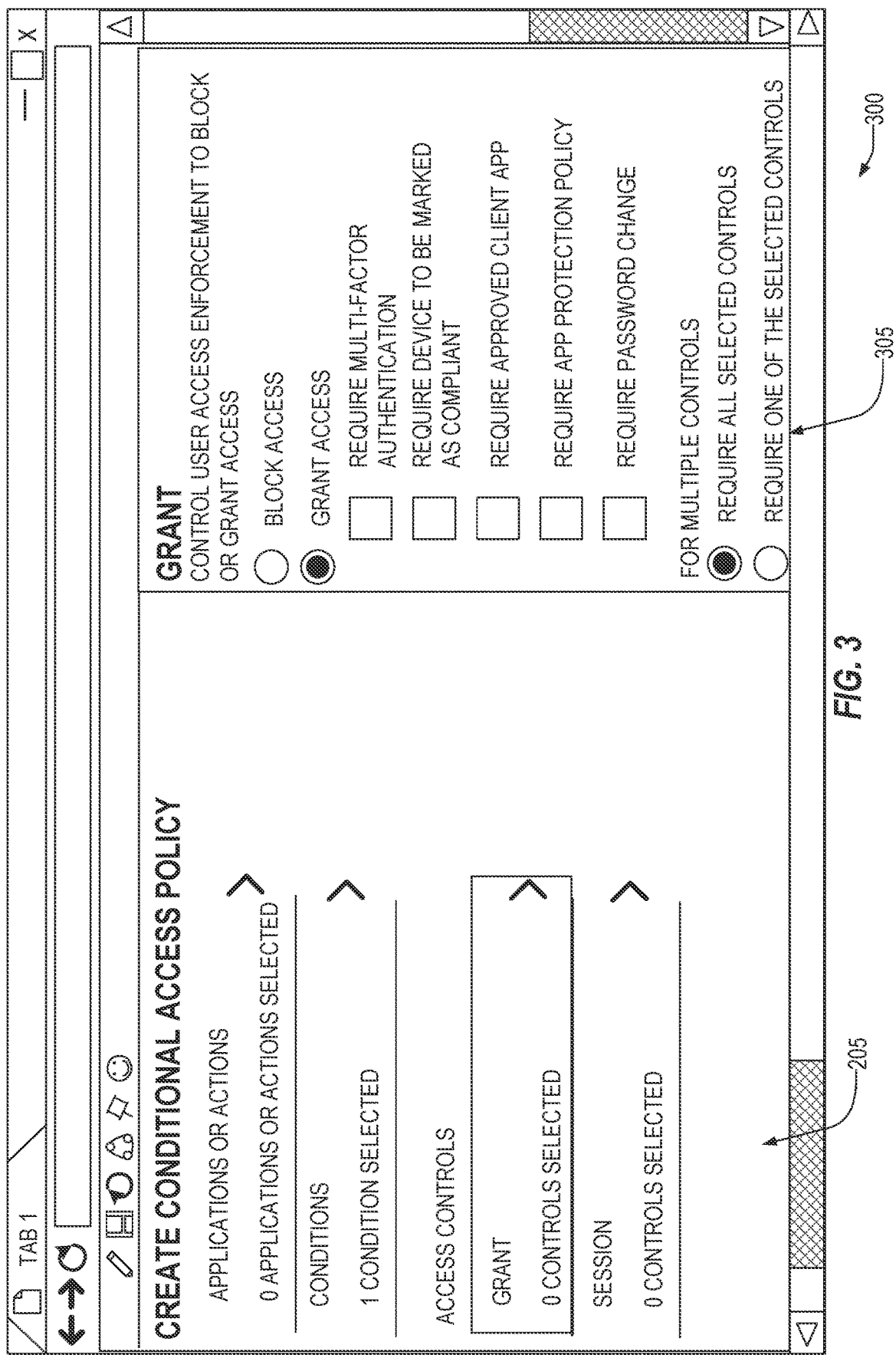
FIG. 3 illustrates the GUI of FIG. 2 scrolled down further on the page from FIG. 2.

FIG. 3 illustrates the GUI of FIG. 2 300 scrolled down further on the page from FIG. 2. Here, the pane 205 displays options for specifying access controls such as whether to allow, grant, or require special procedures if the conditions specified previously are met. The grant option is selected, which displays the grant pane 305 that allows the user to set whether access is blocked or granted and any special conditions to apply to grant access. Example conditions include requiring multi-factor authentication, requiring a compliant device, an approved client application, an application protection policy on the device, or requiring a password change. On the bottom, the user can select what happens when multiple controls are selected. Two options are present, including requiring all the selected controls, or requiring only one of the selected controls (e.g., access is granted if the user either supplies a multi-factor authentication or performs a password change).

Figure 4:
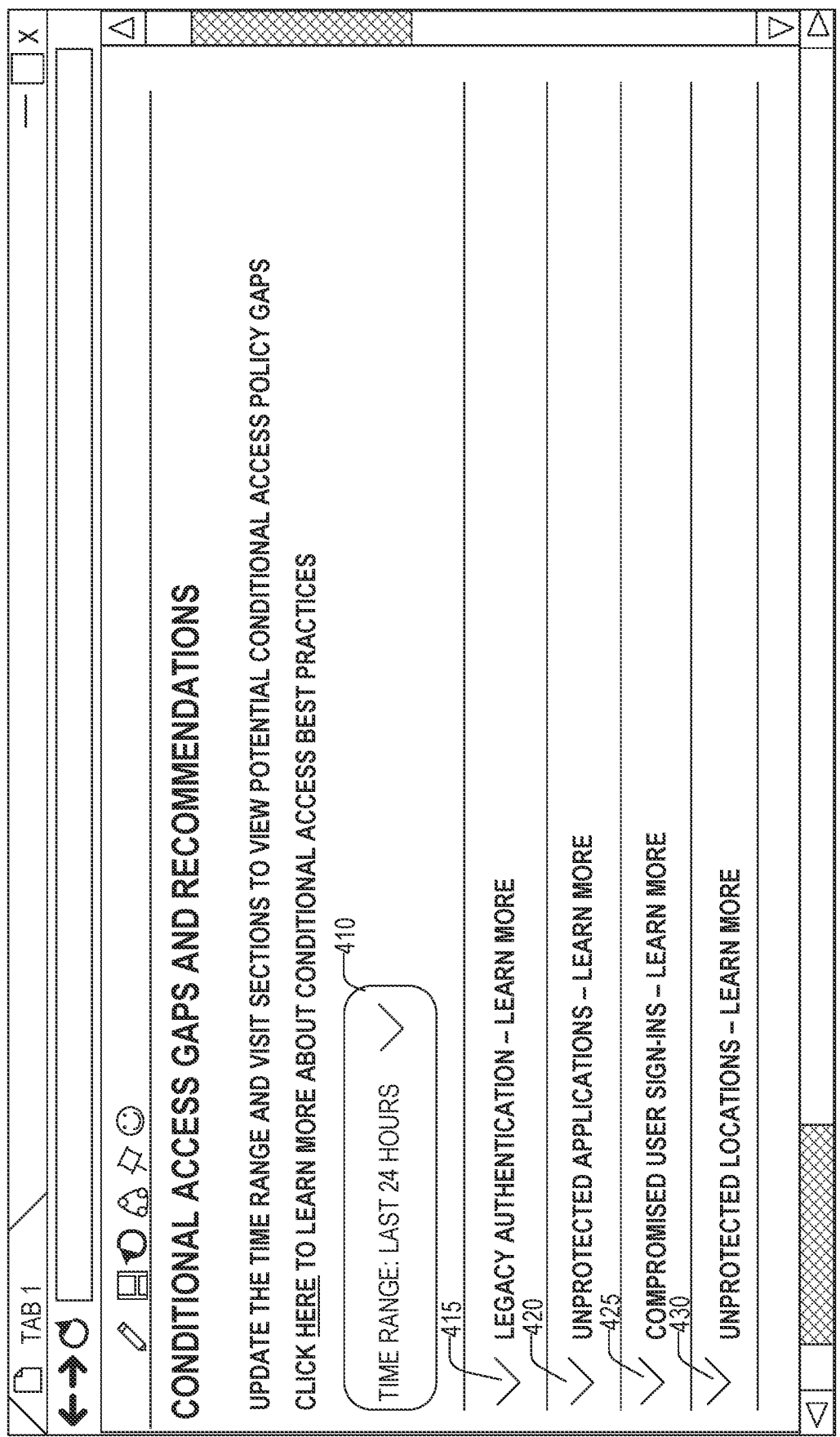
FIG. 4 illustrates a GUI of a recommendation screen that shows access control policy gaps according to some examples of the present disclosure.

FIG. 4 illustrates a GUI 400 of a recommendation screen that shows access control policy gaps according to some examples of the present disclosure. Users may select a time range to see historical gaps using drop down 410. In some examples, the security gaps may be divided into one or more categories, such as legacy authentication gaps 415, unprotected application gaps 420, compromised user sign-in gaps 425, and unprotected location gaps 430. By clicking on the arrow next to each section, more information is provided to the user.

For example. FIG. 5 illustrates an unprotected locations screen 500 according to some examples of the present disclosure. The screen shows a list of users who do not have any conditional access coverage. For example, a gap may have been identified that certain locations are not covered by a conditional access control policy (in this case, the United States). Users that are located within these regions may be listed 510. A map showing a total of the users by location may be shown 505. Thus, the system provides additional analysis on top of the gaps in the policies by providing additional analysis.

Figure 6:
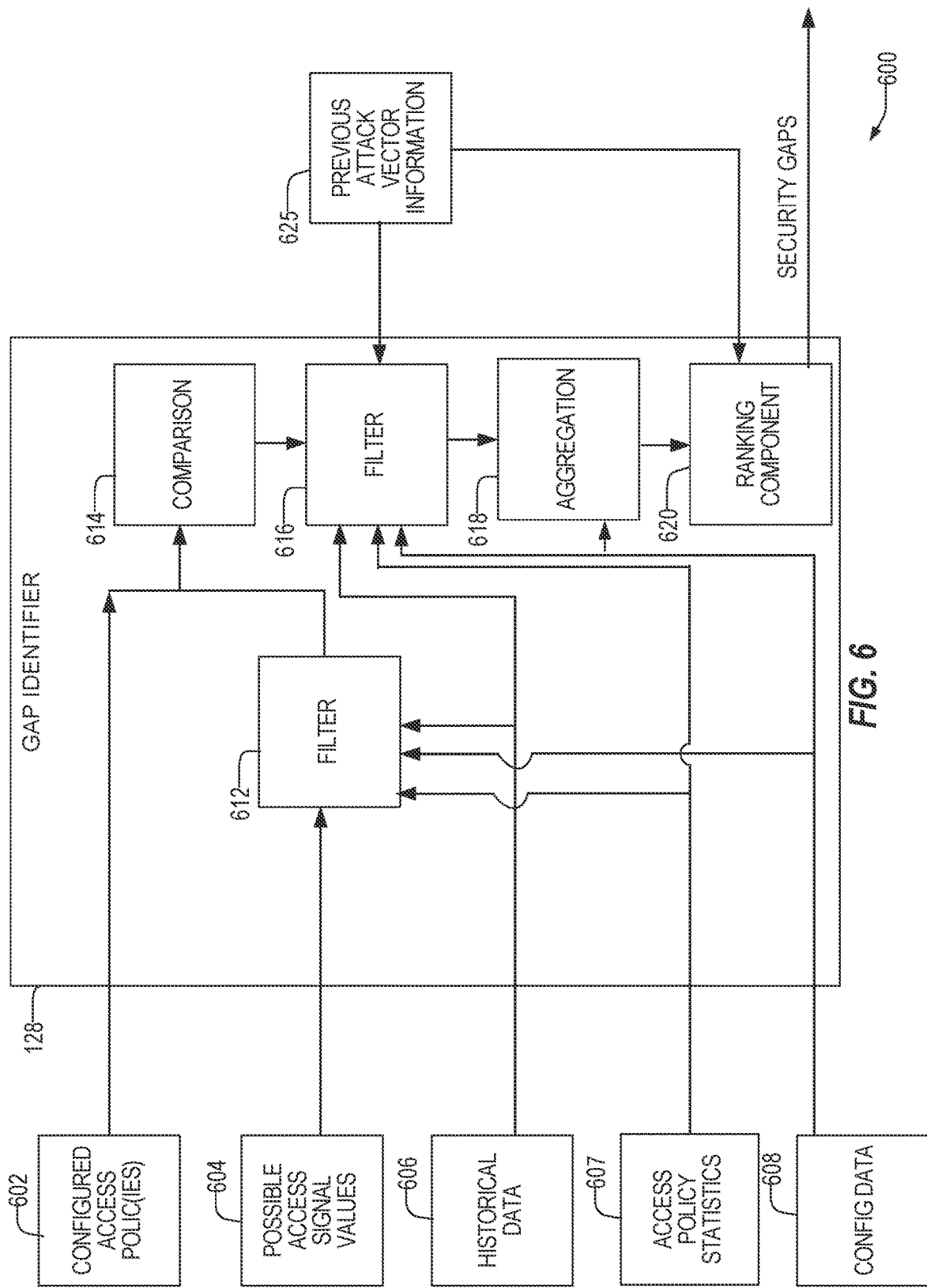
FIG. 6 illustrates a logical diagram of a gap identifier of FIG. 1 according to some examples of the present disclosure.

FIG. 6 illustrates a logical diagram 600 of a gap identifier 128 of FIG. 1 according to some examples of the present disclosure. Gap identifier may use a variety of information to identify gaps in access control policies where access scenarios are not covered. Gap identifier may also filter, aggregate, and rank the identified gaps to present the most relevant information to users. Gap identifier 128 may utilize a set of one or more previously configured access control policies 602 (e.g., policies 127A-127N); a set of one or more possible values of access control signals 604; historical usage data 606; access policy statistics 607, previous attack vector information 625, and configuration data 608. The previously configured access control policies 602 are access control policies previously set by an administrator of the system for controlling access to the computing resource. For example, by making selections and entering information in FIGS. 2 and 3. These access control policies may be stored in one or more data structures.

Possible values of access control signals 604 may include all the possible combinations of signal values within all possible access control policy criteria. For example, if policies have exactly two access control policy criteria— e.g., whether the location of the user is within a defined geographic radius or not, then the set of all possible values of access control signals may include two values, one for when the location of the user is within the defined geographic radius and one for when the location of the user is not within the defined geographic range. As the number of possible signals and the number of possible values for those signals increase, the number of possible values of access control signals 604 will grow.

In some examples, rather than being a comprehensive set of values that covers all possible access control signal values, the possible values of access control signals 604 may include a subset of all possible access control signal values. A subset of the possible values of access control signals 604 may be created, in some examples, by automatically filtering the set of all possible values of access control signals 604 using filter component 612. For example, filter component 612 may utilize historical data 606, configuration data 608, or access policy statistics 607 to filter the possible values of access control signals 604. Historical data 606 may include data from past access attempts for the computerized resource. Example historical data 606 may include statistics on how often particular users login, where they login from, what devices they use, and the like. The filter component 612 may automatically filter out possible values of access control signals 604 that are not common access situations encountered by the system. For example, if the value of the access control signals appears in less than a threshold percentage of previous access attempts, then the value may be filtered out.

In other examples, in addition to, or instead of using historical data 606, access policy statistics 607 may be used to filter out the possible values of access control signals 604 into a subset of possible values. For example, access policy statistics 607 may be a set of most-used access control policy criteria configured for a set of one or more other computing resources. Access control policies from a variety of computerized resources such as email, webhosting, virtual private networks, local area networks, and the like across a variety of different organizations may be represented in the access policy statistics 607. Possible access signal values covered by one or more of these policies may be included by filter component 612 in the subset of possible access signal values. That is, if other access policies for other computerized resources do not worry about a particular access scenario, the possible access signal values corresponding to those scenarios may be filtered out by the filter component 612.

In still other examples, in addition to, or instead of using historical data 606 and access policy statistics 607, the system may use configuration data 608 of the computerized resource. For example, certain possible access signal values may not be applicable to a particular computerized resource. For example, a computerized resource may not allow mobile devices and thus access signals for mobile devices may not be relevant and may be filtered out by filter component 612.

As noted previously, historical data 606, access policy statistics 607, and config data 608 may be used independently or together in any combination by filter component 612 to filter the possible values of access control signals 604 into a subset of possible access control signals. For example, the subset of possible access control signal values may be the signal values that are left after filtering on one or more of historical data 606, access policy statistics 607, and config data 608.

While the filter component 612 is shown as part of the gap identifier 128, in other examples, the filter component 612 may be applied prior to input of the possible values of the access control signals 604 into the gap identifier 128. As noted, a variety of data may be used to perform the filtering, but in other examples, the filtering may be done by a security expert who is able to identify the most important access control policies.

Previously configured access control policies 602 and the possible values of access control signals 604 (which may be filtered by filter component 612 as previously described) may be compared by a comparison component 614. Comparison component 614 may compare all the possible values of access control signals 604 (filtered or unfiltered) with the access control policy criteria in the previously configured access policies 602. Any of the possible values of access control signals 604 that are not addressed by any access policy in the previously configured access policies 602 may be flagged as a potential security gap.

Filter component 616 may automatically filter the identified gaps. For example, using the same or different data used by filter component 612 to filter the possible values of access control signals 604. For example, filter component 616 may utilize historical data 606, configuration data 608, or access policy statistics 607 to filter the potential security gaps. Historical data 606 may include data from previous access attempts for the computerized resource. For example, how often particular users login, where they login from, what devices they use, and the like. The filter component 616 may automatically filter out possible security gaps that represent access scenarios that do not occur over a specified threshold amount of times (as indicated by historical data 606).

In other examples, in addition to, or instead of using historical data 606, access policy statistics 607 may be used to filter out the possible security gaps. For example, gaps may be ignored which would not be closed by one of a set of most-used access control policy criteria used by a plurality of computerized resources.

In still other examples, in addition to, or instead of using historical data 606 and access policy statistics 607, the system may use configuration data 608 of the computerized resource. For example, by filtering out gaps describing access scenarios that are not appropriate for a given configuration, for example, by filtering out gaps that relate to unsupported devices. In other examples, the configuration data 608 contains "ignore" data that causes the system to ignore certain gaps. For example, the gap may have been presented to an administrator previously and the administrator has decided that the gap is not important and has selected an option to ignore this gap in the future.

Finally, the filter component 616 may use previous attack vector information 625 instead of, or in addition to the historical data 606, access policy statistics 607, and configuration data 608. Previous attack vector information may be information describing access signals for access scenarios where unauthorized access was previously identified for the computerized resource or for one or more other computerized resources. Potential security gaps that do not describe scenarios in the previous attack vector information may be filtered out such that only those security gaps that are exploited by the previous attack are presented.

Aggregation component 618 may take a multiple access scenarios for which access policy gaps have been identified and aggregate them into groups of scenarios. For example, if a first security gap indicates that no policy exists for logging in from China and a second security gap indicates that no policy exists for logging in from India. and so on for each country in Asia, the aggregation component 618 may recognize that there are no policies applicable to access scenarios for any country in Asia. The aggregation component 618 may then aggregate these security gaps into a single security gap indicating that no policy specifically applies to accessing the computerized resource from Asia. The aggregation component 618 may utilize aggregation rules for each gap type. For example, as noted in the previous example, the rules may allow aggregation of small geographic zones into larger geographic zones (e.g., individual countries to larger regions if there are gaps for all the individual countries in the large region). As another example, gaps related to operating systems may generalize to version ranges (e.g., instead of having separate gaps for Android 4.0, 5.0, 6.0, and 7.0 the gap would be generalized to Android 4-7).

Ranking component 620 may rank the identified gaps based upon a priority. For example, the previous attack vector information 625 may be used to rank vulnerabilities that were used as a previous attack vector higher than other gaps. In other examples, a priority list may be used that specifies a rank based upon the type of gap. In some examples, the previous attack vector information is used to rank the access scenarios where gaps are identified that have been previously associated with an unauthorized access higher than other identified access scenarios. After ranking component 620 is done ranking the gaps, the security gaps are outputted as a ranked list of access control vulnerabilities.

As shown, gap identifier 128 includes filter components 612, 616, aggregation component 618 and ranking component 620. In other examples, gap identifier 128 may not include these components (and may not perform the stated functionality), but in other examples, one or more of these components, but not all of these components may be included in gap identifier 128. As noted, one or more of filter component 612, filter component 616, aggregation component 618 and ranking component 620 may be used alone or in combination. In some examples, which of these components is used may be set by a user as a configuration setting. In addition, in some examples, the information (e.g., historical data 606, access policy statistics 607, configuration data 608, and previous attack vector information 625) used to filter, aggregate, and rank the gaps may also be determined based upon a user configuration setting.

Figure 7:
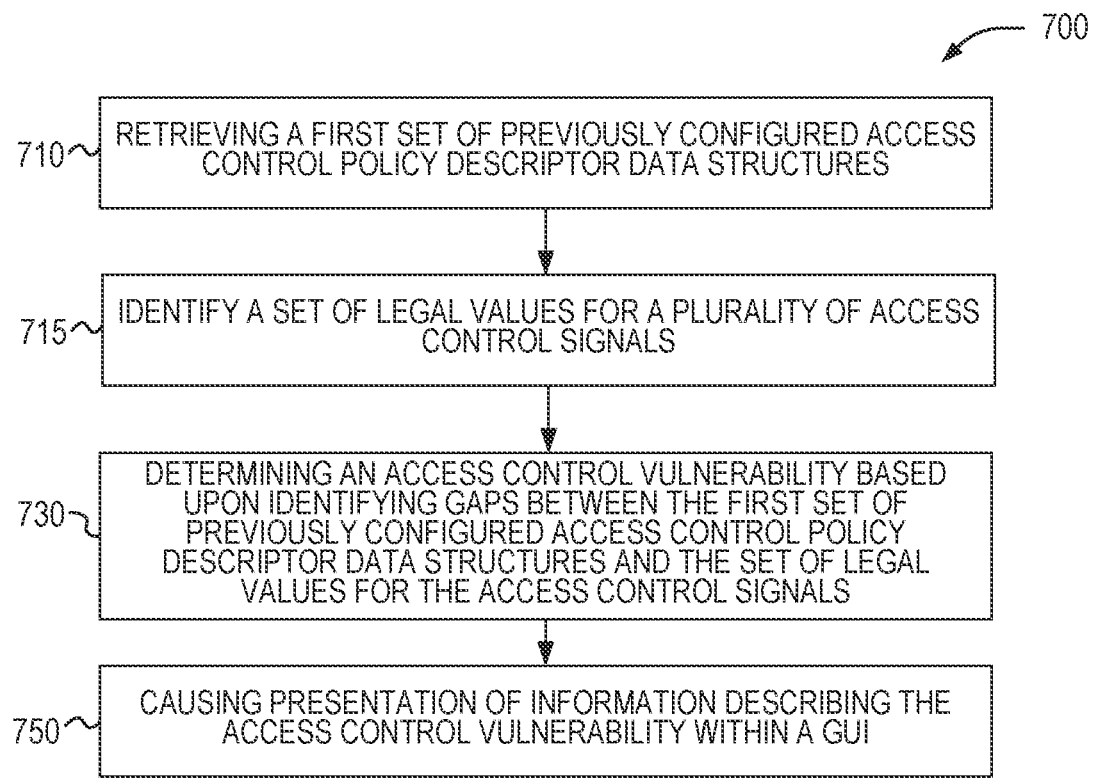
FIG. 7 illustrates a flowchart of a method of identifying one or more access control vulnerabilities according to some examples of the present disclosure.

FIG. 7 illustrates a flowchart of a method 700 of identifying one or more access control vulnerabilities according to some examples of the present disclosure. At operation 710, a set of previously configured access control policy descriptor data structures are retrieved. The data structures may be stored in a database (e.g., database 125) accessible to an access control computing device (e.g., such as access control computing device 120). The access control policy descriptor data structures may define access control policies which store access control policy criteria that are evaluated against access control signals to determine whether the policy applies, and if the policy applies, what access controls are imposed. Access controls include granting access, denying access, or imposing conditions on the grant of access. Conditions may include requiring additional authentication or verification, restrictions on device type, access levels, privileges, and the like.

At operation 715, the system may identify a set of legal values for the plurality of access control signals. The set of legal values may be all legal values for all possible access control signals or may be a subset formed as previously described. At operation 730, the system may determine an access control vulnerability based upon identifying a pattern of gaps between the first set of previously configured access control policy descriptor data structures and a set of legal values for the access control signals. As previously described, this may be done by evaluating the access control policies described by the access control policy descriptor data structures to determine legal values of access control signals that are not covered by the set of access control policy descriptors. At operation 750, the system may present the information describing one or more of the access control vulnerabilities identified in operation 730. As previously noted, the vulnerabilities may first be one or more of: filtered (e.g., by filter component 616), aggregated (e.g., by aggregation component 618), or ranked (e.g., by ranking component 620).

As previously described, the functionality described herein may be accessed through one or more GUIs. In other examples, the functionality described herein may be accessed through an Application Programming Interface (API). For example, access control policies may be created, modified, deleted, or otherwise managed through one or more API calls. In addition, the gap identifier may be triggered from a request sent through one or more API calls and the gaps identified through a message sent to the requestor.

Figure 8:
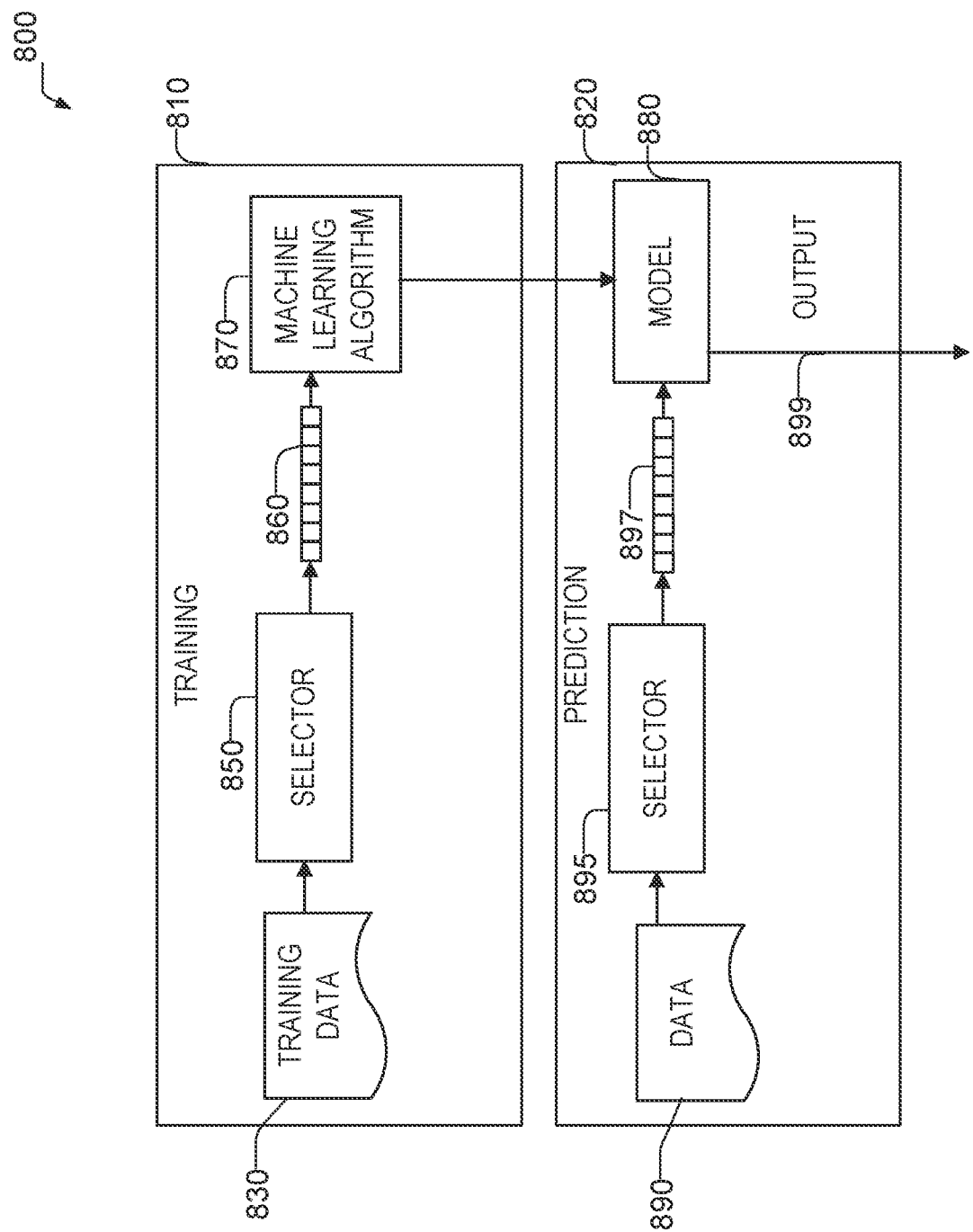
FIG. 8 shows an example machine learning module according to some examples of the present disclosure.

In some examples, machine learning may be used to identify uncovered access control scenarios. FIG. 8 shows an example machine learning module 800 according to some examples of the present disclosure. The machine learning module 800 may be implemented in whole or in part by one or more computing devices. In some examples, the training module 810 may be implemented by a different device than the prediction module 820. In these examples, the model 880 may be created on a first machine and then sent to a second machine. One or more of modules 810 and 820 may be implemented by gap identifier 128.

Machine learning module 800 utilizes a training module 810 and a prediction module 820. Training module 810 inputs training data 830 into selector module 850. The training data 830 may include one or more of possible access signal values, historical access data, access policy statistics, model access control policies, configuration data, or previous attack vector information. The training data 830 may be labeled with important possible access signal values or with important access control policies. In other examples, the training data may not be labeled, and the model may be trained using feedback data—such as through a reinforcement learning method.

Selector module 850 selects training vector 860 from the training data 830. The selected data may fill training vector 860 and comprises a set of the training data that is determined to be predictive of access control policy gaps. Information chosen for inclusion in the training vector 860 may be all the training data 830 or in some examples, may be a subset of all the training data 830. The training vector 860 may be utilized (along with any applicable labels) by the machine learning algorithm 870 to produce a model 880. In some examples, other data structures other than vectors may be used. The machine learning algorithm 870 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected.

In the prediction module 820, data 890 may be input to the selector module 895. The data 890 includes current policy data and/or historical access data. Selector module 895 may operate the same, or differently than selector module 850. In some examples, selector modules 850 and 895 are the same modules or different instances of the same module. Selector module 895 produces vector 897, which is input into the model 880 to produce an identification of gaps 899. For example, the weightings and/or network structure learned by the training module 810 may be executed on the vector 897 by applying vector 897 to a first layer of the model 880 to produce inputs to a second layer of the model 880, and so on until the identification of the gaps is output. As previously noted, other data structures may be used other than a vector (e.g., a matrix).

The training module 810 may operate in an offline manner to train the model 880. The prediction module 820, however, may be designed to operate in an online manner. It should be noted that the model 880 may be periodically updated via additional training and/or user feedback. For example, additional training data 830 may be collected as users provide feedback on the identified gaps. The feedback, along with the data 890 corresponding to that feedback, may be used to refine the model by the training module 810.

The machine learning algorithm 870 may be selected from among many different potential supervised or unsupervised machine learning algorithms. Examples of learning algorithms include artificial neural networks, convolutional neural networks. Bayesian networks, instance-based learning, support vector machines, decision trees (e.g., Iterative Dichotomiser 3, C4.5, Classification and Regression Tree (CART). Chi-squared Automatic interaction Detector (CHAID), and the like), random forests, linear classifiers, quadratic classifiers, k-nearest neighbor, linear regression, logistic regression, a region based CNN, a full CNN (for semantic segmentation), a mask R-CNN algorithm for instance segmentation, and hidden Markov models. Examples of unsupervised learning algorithms include expectation-maximization algorithms, vector quantization, and information bottleneck method.

Figure 9:
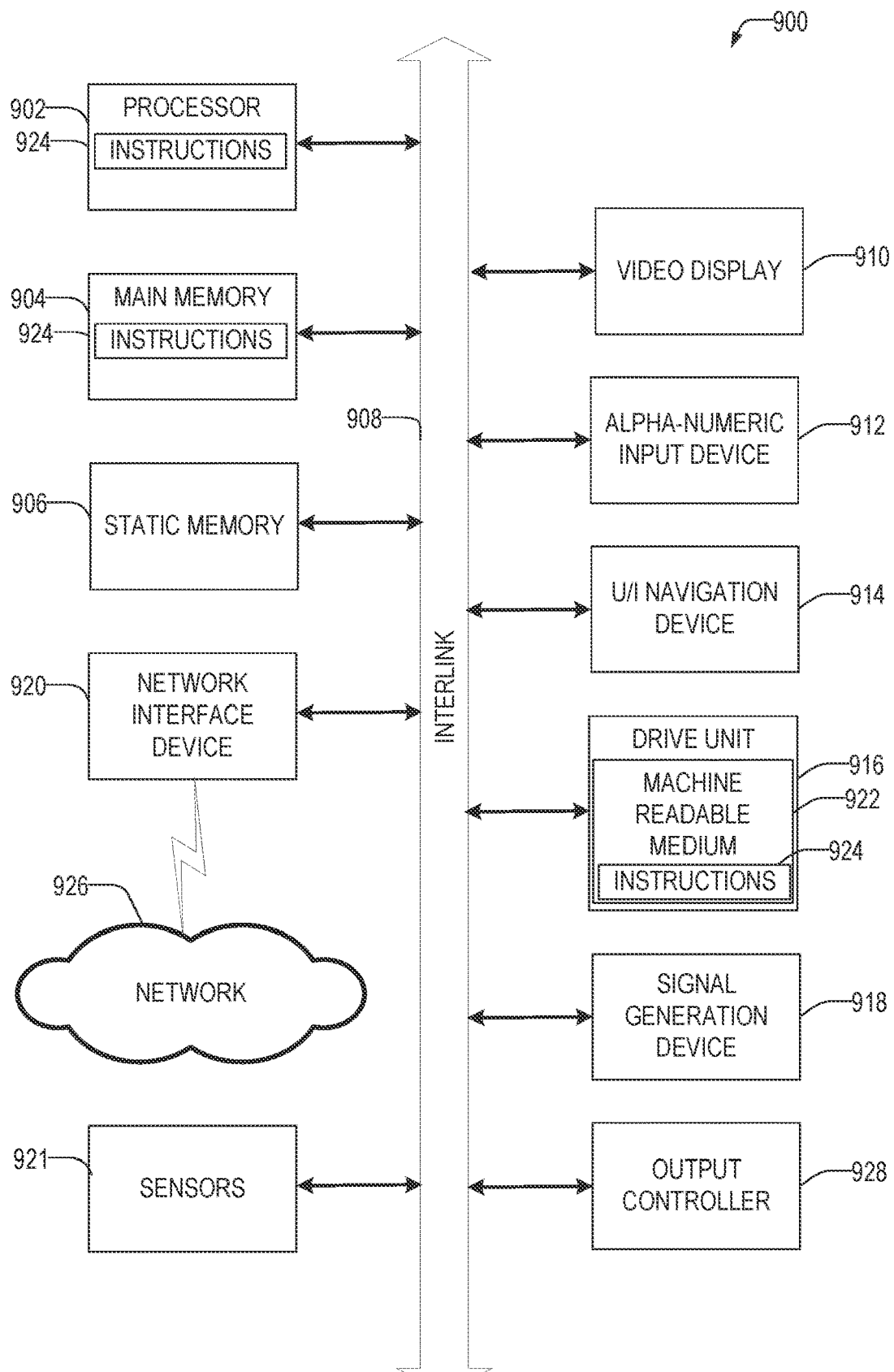
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a computing device, such as user computing devices 110, 105 of FIG. 1; a computing device providing a computerized resource, such as computing device 115; an access control computing device, such as access control computing device 120 of FIG. 1. Machine 900 may be in the form of a server computer, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 900 may provide one or more GUIs, such as those shown in FIGS. 2-5, be configured to implement the components of FIGS. 1, 6, and 8 and the method of FIG. 7. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920. The Machine 900 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

Other Notes and Examples

Example 1 is a computer-implemented method for enhancing access control for a computerized resource, the method comprising: using one or more hardware processors: retrieving, from a storage device, a set of one or more previously configured access control policy descriptor data structures of an organization, the access control policy descriptor data structures describing access control policies applicable to granting access to the computerized resource, each particular access control policy descriptor data structure defining access controls and access control criteria defining values for a set of one or more access control signals for which the particular access control policy is applicable; identifying a set of one or more legal values for a plurality of access control signals; determining an access control vulnerability based upon identifying gaps between the set of previously configured access control policy descriptor data structures and the set of legal values for the access control signals; and causing presentation of information describing the access control vulnerability within a graphical user interface.

In Example 2, the subject matter of Example 1 includes, wherein the access control signals comprise one or more of: a geolocation of a computing device requesting access, a device identifier of the computing device requesting access, a type of the computing device requesting access, a time of day of an access request, or a user privilege level.

In Example 3, the subject matter of Examples 1-2 includes, generating, based upon the access control vulnerability, a new access control policy descriptor data structure applicable to granting access to the computerized resource that addresses the access control vulnerability; and causing a recommendation to be transmitted to adopt a new access control policy described by the new access control policy descriptor data structure.

In Example 4, the subject matter of Examples 1-3 includes, generating, based upon the access control vulnerability, a new access control policy descriptor data structure applicable to granting access to the computerized resource that addresses the access control vulnerability; and automatically applying a new access control policy described by the new access control policy descriptor data structure by adding the new access control policy to the set of previously configured access control policy descriptor data structures without user input approving the application of the new access control policy.

In Example 5, the subject matter of Examples 1-4 includes, receiving an access request from a computing device for the computerized resource; determining access control signals corresponding to the access request; based upon the access control signals, determining a set of one or more applicable access control policies from access policies described in the set of one or more previously configured access control policy descriptor data structures using the access control signals; applying an access procedure specified by the access controls within the set of one or more applicable access control policies to determine whether to allow access to the computerized resource; and responsive to determining, based upon the access procedure, that the computing device is allowed to access the computerized resource, causing access to be granted to the computerized resource by the computing device.

In Example 6, the subject matter of Examples 1-5 includes, wherein the set of legal values for the plurality of access control signals comprises all combinations of all allowed access signals for all legal access control signals.

In Example 7, the subject matter of Examples 1-6 includes, wherein the set of legal values for the plurality of access control signals comprises pre-specified combinations of allowed access signals.

In Example 8, the subject matter of Examples 1-7 includes, wherein determining the set of legal values for the plurality of access control signals comprises utilizing historical contexts of users of the computerized resource.

In Example 9, the subject matter of Examples 1-8 includes, determining a second access control vulnerability based upon identifying a second pattern of gaps between the set of previously configured access control policy descriptor data structures and the set of legal values for the plurality of access control signals; and applying a filtering policy to the first and second access control vulnerabilities, the filtering policy specifying that the second access control vulnerability is not to be shown.

Example 10 is a computing device for enhancing access control for a computerized resource, the computing device comprising: one or more hardware processors; a memory device, the memory device storing instructions, which when executed by the one or more hardware processors, causes the computing device to perform operations comprising: retrieving, from a storage device, a set of one or more previously configured access control policy descriptor data structures of an organization, the access control policy descriptor data structures describing access control policies applicable to granting access to the computerized resource, each particular access control policy descriptor data structure defining access controls and access control criteria defining values for a set of one or more access control signals for which the particular access control policy is applicable; identifying a set of one or more legal values for a plurality of access control signals; determining an access control vulnerability based upon identifying gaps between the set of previously configured access control policy descriptor data structures and the set of legal values for the access control signals; and causing presentation of information describing the access control vulnerability within a graphical user interface.

In Example 11, the subject matter of Example 10 includes, wherein the access control signals comprise one or more of: a geolocation of a computing device requesting access, a device identifier of the computing device requesting access, a type of the computing device requesting access, a time of day of an access request, or a user privilege level.

In Example 12, the subject matter of Examples 10-11 includes, wherein the operations further comprise: generating, based upon the access control vulnerability, a new access control policy descriptor data structure applicable to granting access to the computerized resource that addresses the access control vulnerability; and causing a recommendation to be transmitted to adopt a new access control policy described by the new access control policy descriptor data structure.

In Example 13, the subject matter of Examples 10-12 includes, wherein the operations further comprise: generating, based upon the access control vulnerability, a new access control policy descriptor data structure applicable to granting access to the computerized resource that addresses the access control vulnerability; and automatically applying a new access control policy described by the new access control policy descriptor data structure by adding the new access control policy to the set of previously configured access control policy descriptor data structures without user input approving the application of the new access control policy.

In Example 14, the subject matter of Examples 10-13 includes, wherein the operations further comprise: receiving an access request from a computing device for the computerized resource; determining access control signals corresponding to the access request; based upon the access control signals, determining a set of one or more applicable access control policies from access policies described in the set of one or more previously configured access control policy descriptor data structures using the access control signals; applying an access procedure specified by the access controls within the set of one or more applicable access control policies to determine whether to allow access to the computerized resource; and responsive to determining, based upon the access procedure, that the computing device is allowed to access the computerized resource, causing access to be granted to the computerized resource by the computing device.

In Example 15, the subject matter of Examples 10-14 includes, wherein the set of legal values for the plurality of access control signals comprises all combinations of all allowed access signals for all legal access control signals.

In Example 16, the subject matter of Examples 10-15 includes, wherein the set of legal values for the plurality of access control signals comprises pre-specified combinations of allowed access signals.

In Example 17, the subject matter of Examples 10-16 includes, wherein the operations of determining the set of legal values for the plurality of access control signals comprises utilizing historical contexts of users of the computerized resource.

In Example 18, the subject matter of Examples 10-17 includes, wherein the operations further comprise: determining a second access control vulnerability based upon identifying a second pattern of gaps between the set of previously configured access control policy descriptor data structures and the set of legal values for the plurality of access control signals; and applying a filtering policy to the first and second access control vulnerabilities, the filtering policy specifying that the second access control vulnerability is not to be shown.

Example 19 is a machine-readable medium, storing instructions, which when executed by a machine, causes the machine to perform operations comprising: retrieving, from a storage device, a set of one or more previously configured access control policy descriptor data structures of an organization, the access control policy descriptor data structures describing access control policies applicable to granting access to a computerized resource, each particular access control policy descriptor data structure defining access controls and access control criteria defining values for a set of one or more access control signals for which the particular access control policy is applicable; identifying a set of one or more legal values for a plurality of access control signals; determining an access control vulnerability based upon identifying gaps between the set of previously configured access control policy descriptor data structures and the set of legal values for the access control signals; and causing presentation of information describing the access control vulnerability within a graphical user interface.

In Example 20, the subject matter of Example 19 includes, wherein the access control signals comprise one or more of: a geolocation of a computing device requesting access, a device identifier of the computing device requesting access, a type of the computing device requesting access, a time of day of an access request, or a user privilege level.

In Example 21, the subject matter of Examples 19-20 includes, wherein the operations further comprise: generating, based upon the access control vulnerability, a new access control policy descriptor data structure applicable to granting access to the computerized resource that addresses the access control vulnerability; and causing a recommendation to be transmitted to adopt a new access control policy described by the new access control policy descriptor data structure.

In Example 22, the subject matter of Examples 19-21 includes, wherein the operations further comprise: generating, based upon the access control vulnerability, a new access control policy descriptor data structure applicable to granting access to the computerized resource that addresses the access control vulnerability; and automatically applying a new access control policy described by the new access control policy descriptor data structure by adding the new access control policy to the set of previously configured access control policy descriptor data structures without user input approving the application of the new access control policy.

In Example 23, the subject matter of Examples 19-22 includes, wherein the operations further comprise: receiving an access request from a computing device for the computerized resource; determining access control signals corresponding to the access request; based upon the access control signals, determining a set of one or more applicable access control policies from access policies described in the set of one or more previously configured access control policy descriptor data structures using the access control signals; applying an access procedure specified by the access controls within the set of one or more applicable access control policies to determine whether to allow access to the computerized resource; and responsive to determining, based upon the access procedure, that the computing device is allowed to access the computerized resource, causing access to be granted to the computerized resource by the computing device.

In Example 24, the subject matter of Examples 19-23 includes, wherein the set of legal values for the plurality of access control signals comprises all combinations of all allowed access signals for all legal access control signals.

In Example 25, the subject matter of Examples 19-24 includes, wherein the set of legal values for the plurality of access control signals comprises pre-specified combinations of allowed access signals.

In Example 26, the subject matter of Examples 19-25 includes, wherein the operations of determining the set of legal values for the plurality of access control signals comprises utilizing historical contexts of users of the computerized resource.

In Example 27, the subject matter of Examples 19-26 includes, wherein the operations further comprise: determining a second access control vulnerability based upon identifying a second pattern of gaps between the set of previously configured access control policy descriptor data structures and the set of legal values for the plurality of access control signals; and applying a filtering policy to the first and second access control vulnerabilities, the filtering policy specifying that the second access control vulnerability is not to be shown.

Example 28 is a computing device for enhancing access control for a computerized resource, the computing device comprising: means for retrieving, from a storage device, a set of one or more previously configured access control policy descriptor data structures of an organization, the access control policy descriptor data structures describing access control policies applicable to granting access to the computerized resource, each particular access control policy descriptor data structure defining access controls and access control criteria defining values for a set of one or more access control signals for which the particular access control policy is applicable; means for identifying a set of one or more legal values for a plurality of access control signals; means for determining an access control vulnerability based upon identifying gaps between the set of previously configured access control policy descriptor data structures and the set of legal values for the access control signals; and means for causing presentation of information describing the access control vulnerability within a graphical user interface.

In Example 29, the subject matter of Example 28 includes, wherein the access control signals comprise one or more of: a geolocation of a computing device requesting access, a device identifier of the computing device requesting access, a type of the computing device requesting access, a time of day of an access request, or a user privilege level.

In Example 30, the subject matter of Examples 28-29 includes, means for generating, based upon the access control vulnerability, a new access control policy descriptor data structure applicable to granting access to the computerized resource that addresses the access control vulnerability; and means for causing a recommendation to be transmitted to adopt a new access control policy described by the new access control policy descriptor data structure.

In Example 31, the subject matter of Examples 28-30 includes, means for generating, based upon the access control vulnerability, a new access control policy descriptor data structure applicable to granting access to the computerized resource that addresses the access control vulnerability; and means for automatically applying a new access control policy described by the new access control policy descriptor data structure by adding the new access control policy to the set of previously configured access control policy descriptor data structures without user input approving the application of the new access control policy.

In Example 32, the subject matter of Examples 28-31 includes, means for receiving an access request from a computing device for the computerized resource; means for determining access control signals corresponding to the access request; means for, based upon the access control signals, determining a set of one or more applicable access control policies from access policies described in the set of one or more previously configured access control policy descriptor data structures using the access control signals; means for applying an access procedure specified by the access controls within the set of one or more applicable access control policies to determine whether to allow access to the computerized resource; and means for, responsive to determining, based upon the access procedure, that the computing device is allowed to access the computerized resource, causing access to be granted to the computerized resource by the computing device.

In Example 33, the subject matter of Examples 28-32 includes, wherein the set of legal values for the plurality of access control signals comprises all combinations of all allowed access signals for all legal access control signals.

In Example 34, the subject matter of Examples 28-33 includes, wherein the set of legal values for the plurality of access control signals comprises pre-specified combinations of allowed access signals.

In Example 35, the subject matter of Examples 28-34 includes, wherein the means for determining the set of legal values for the plurality of access control signals comprises means for utilizing historical contexts of users of the computerized resource.

In Example 36, the subject matter of Examples 28-35 includes, means for determining a second access control vulnerability based upon identifying a second pattern of gaps between the set of previously configured access control policy descriptor data structures and the set of legal values for the plurality of access control signals; and means for applying a filtering policy to the first and second access control vulnerabilities, the filtering policy specifying that the second access control vulnerability is not to be shown.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

What is claimed is:

1. A computer-implemented method for enhancing access control for a computerized resource, the method comprising:
using one or more hardware processors:
retrieving, from a storage device, a set of one or more previously configured access control policy descriptor data structures of an organization, the set of one or more previously configured access control policy descriptor data structures describing access control policies applicable to granting access to the computerized resource, each particular previously configured access control policy descriptor data structure defining access controls and access control criteria including values for a corresponding applicable set of one or more access control signals;
identifying a set of one or more legal values for a plurality of access control signals;
determining an access control vulnerability based upon identifying gaps between the set of previously configured access control policy descriptor data structures and the set of legal values for the access control signals, the gaps including at least one legal value missing from the values of the corresponding applicable set of one or more access control signals for at least one of the set of one or more previously configured access control policy descriptor data structures; and
causing presentation of information describing the access control vulnerability within a graphical user interface.

2. The method of claim 1, wherein the access control signals comprise one or more of: a geolocation of a computing device requesting access, a device identifier of the computing device requesting access, a type of the computing device requesting access, a time of day of an access request, or a user privilege level.

3. The method of claim 1, further comprising:
generating, based upon the access control vulnerability, a new access control policy descriptor data structure applicable to granting access to the computerized resource that addresses the access control vulnerability; and
causing a recommendation to be transmitted to adopt a new access control policy described by the new access control policy descriptor data structure.

4. The method of claim 1, further comprising:
generating, based upon the access control vulnerability, a new access control policy descriptor data structure applicable to granting access to the computerized resource that addresses the access control vulnerability; and
automatically applying a new access control policy described by the new access control policy descriptor data structure by adding the new access control policy to the set of previously configured access control policy descriptor data structures without user input approving the application of the new access control policy.

5. The method of claim 1, further comprising:
receiving an access request from a computing device for the computerized resource;
determining access control signals corresponding to the access request;
based upon the access control signals, determining a set of one or more applicable access control policies from access policies described in the set of one or more previously configured access control policy descriptor data structures using the access control signals;
applying an access procedure specified by the access controls within the set of one or more applicable access control policies to determine whether to allow access to the computerized resource; and
responsive to determining, based upon the access procedure, that the computing device is allowed to access the computerized resource, causing access to be granted to the computerized resource by the computing device.

6. The method of claim 1, wherein the set of legal values for the plurality of access control signals comprises all combinations of all allowed access signals for all legal access control signals.

7. The method of claim 1, wherein the set of legal values for the plurality of access control signals comprises pre-specified combinations of allowed access signals.

8. The method of claim 1, wherein determining the set of legal values for the plurality of access control signals comprises utilizing historical contexts of users of the computerized resource.

9. The method of claim 1, further comprising:
determining a second access control vulnerability based upon identifying a second pattern of gaps between the set of previously configured access control policy descriptor data structures and the set of legal values for the plurality of access control signals; and
applying a filtering policy to the first and second access control vulnerabilities, the filtering policy specifying that the second access control vulnerability is not to be shown.

10. A computing device for enhancing access control for a computerized resource, the computing device comprising:
one or more hardware processors;
a memory device, the memory device storing instructions, which when executed by the one or more hardware processors, causes the computing device to perform operations comprising:
retrieving, from a storage device, a set of one or more previously configured access control policy descriptor data structures of an organization, the set of one or more previously configured access control policy descriptor data structures describing access control policies applicable to granting access to the computerized resource, each particular previously configured access control policy descriptor data structure defining access controls and access control criteria including values for a corresponding applicable set of one or more access control signals;
identifying a set of one or more legal values for a plurality of access control signals;
determining an access control vulnerability based upon identifying gaps between the set of previously configured access control policy descriptor data structures and the set of legal values for the access control signals, the gaps including at least one legal value missing from the values of the corresponding applicable set of one or more access control signals for at least one of the set of one or more previously configured access control policy descriptor data structures; and causing presentation of information describing the access control vulnerability within a graphical user interface.

11. The computing device of claim 10, wherein the access control signals comprise one or more of:
a geolocation of a computing device requesting access, a device identifier of the computing device requesting access, a type of the computing device requesting access, a time of day of an access request, or a user privilege level.

12. The computing device of claim 10, wherein the operations further comprise:
generating, based upon the access control vulnerability, a new access control policy descriptor data structure applicable to granting access to the computerized resource that addresses the access control vulnerability; and
causing a recommendation to be transmitted to adopt a new access control policy described by the new access control policy descriptor data structure.

13. The computing device of claim 10, wherein the operations further comprise:
generating, based upon the access control vulnerability, a new access control policy descriptor data structure applicable to granting access to the computerized resource that addresses the access control vulnerability; and
automatically applying a new access control policy described by the new access control policy descriptor data structure by adding the new access control policy to the set of previously configured access control policy descriptor data structures without user input approving the application of the new access control policy.

14. The computing device of claim 10, wherein the operations further comprise:
receiving an access request from a computing device for the computerized resource;
determining access control signals corresponding to the access request;
based upon the access control signals, determining a set of one or more applicable access control policies from access policies described in the set of one or more previously configured access control policy descriptor data structures using the access control signals;
applying an access procedure specified by the access controls within the set of one or more applicable access control policies to determine whether to allow access to the computerized resource; and
responsive to determining, based upon the access procedure, that the computing device is allowed to access the computerized resource, causing access to be granted to the computerized resource by the computing device.

15. The computing device of claim 10, wherein the set of legal values for the plurality of access control signals comprises all combinations of all allowed access signals for all legal access control signals.

16. The computing device of claim 10, wherein the set of legal values for the plurality of access control signals comprises pre-specified combinations of allowed access signals.

17. The computing device of claim 10, wherein the operations of determining the set of legal values for the plurality of access control signals comprises utilizing historical contexts of users of the computerized resource.

18. The computing device of claim 10, wherein the operations further comprise:
determining a second access control vulnerability based upon identifying a second pattern of gaps between the set of previously configured access control policy descriptor data structures and the set of legal values for the plurality of access control signals; and
applying a filtering policy to the first and second access control vulnerabilities, the filtering policy specifying that the second access control vulnerability is not to be shown.

19. A machine-readable medium, storing instructions, which when executed by a machine, causes the machine to perform operations comprising:
retrieving, from a storage device, a set of one or more previously configured access control policy descriptor data structures of an organization, the set of one or more previously configured access control policy descriptor data structures describing access control policies applicable to granting access to a computerized resource, each particular previously configured access control policy descriptor data structure defining access controls and access control criteria including values for a corresponding applicable set of one or more access control signals;
identifying a set of one or more legal values for a plurality of access control signals;
determining an access control vulnerability based upon identifying gaps between the set of previously configured access control policy descriptor data structures and the set of legal values for the access control signals, the gaps including at least one legal value missing from the values of the corresponding applicable set of one or more access control signals for at least one of the set of one or more previously configured access control policy descriptor data structures; and
causing presentation of information describing the access control vulnerability within a graphical user interface.

20. The machine-readable medium of claim 19, wherein the operations further comprise:
generating, based upon the access control vulnerability, a new access control policy descriptor data structure applicable to granting access to the computerized resource that addresses the access control vulnerability; and
automatically applying a new access control policy described by the new access control policy descriptor data structure by adding the new access control policy to the set of previously configured access control policy descriptor data structures without user input approving the application of the new access control policy.

* * * * *